Dec. 11, 1951  A. H. ROSENTHAL  2,578,601
SUPERSONIC LIGHT MODULATOR
Filed Nov. 16, 1946
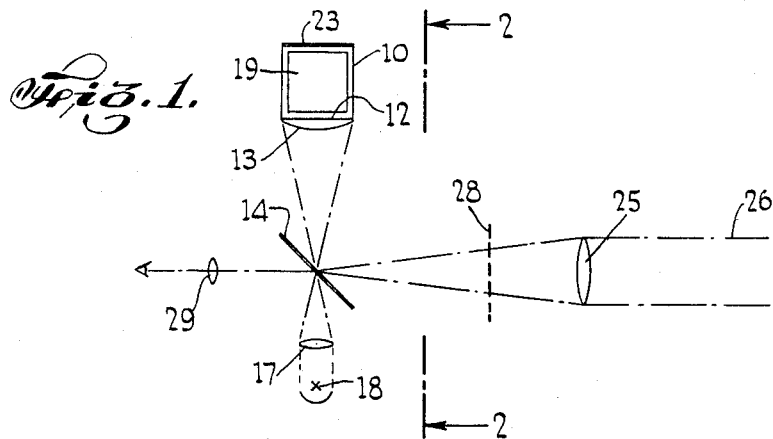
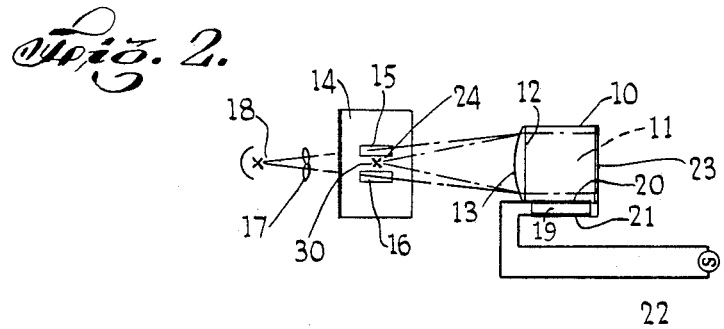
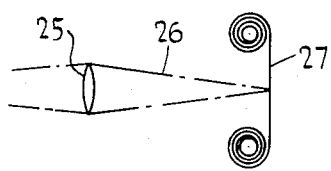
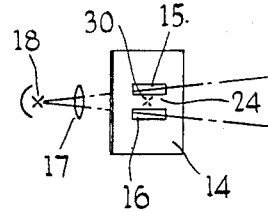
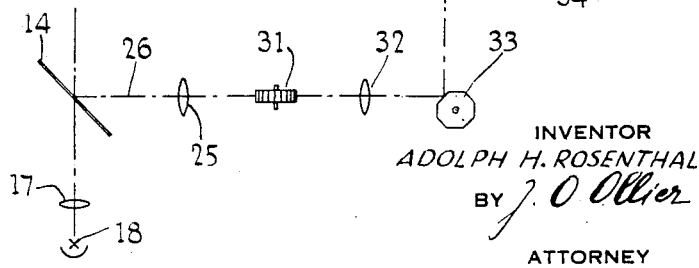
INVENTOR
ADOLPH H. ROSENTHAL
BY J. O. Ollier
ATTORNEY Patented Dec. 11, 1951

2,578,601

UNITED STATES PATENT OFFICE 2,578,601

SUPERSONIC LIGHT MODULATOR

Adolph H. Rosenthal, New York, N. Y., assignor, by mesne assignments, to Skiatron Electronics and Television Corporation, a corporation of New York Application November 16, 1946, Serial No. 710,345

14 Claims. (Cl. 88—61)

This invention relates to supersonic light modulators and in particular to the transformation of modulated electric oscillations or signals into correspondingly modulated signals of light within the visible and/or invisible range of the spectrum. Extensive use for this type of modulation may be found in the arts of television, sound recording, the transmission of signals along a beam of light and for many other purposes.

The modulation of light has already been accomplished by passing a light beam through a body of liquid capable of being excited to mechanical oscillations by a vibrator, for instance, which forms part of an electric circuit and which in turn responds to electric supersonic high frequency oscillations and their amplitude changes. The mechanical vibrations of the vibrator caused by the changes or modulations of the high frequency oscillations produce corresponding mechanical compressional waves in the liquid and, by diffraction, a corresponding intensity modulation of a light beam traversing the body in a direction substantially perpendicular to the path along which the mechanical waves are propagated in the liquid or body as disclosed, for example, in United States Patents Nos. 2,155,659, 2,155,660, 2,155,661, and 2,270,232.

The general object of the present invention is to provide an improved supersonic light modulator having the advantages of high efficiency, compactness and few parts with consequent economy and ease of adjustment. A further important object of the invention is to provide an improved and highly efficient method for modulating a beam of light. A still further object of the invention is to provide an improved arrangement and method for easily and accurately directing a modulated light beam toward a distant receiving station.

The invention will be better understood from the following description taken in connection with the accompanying drawing in which Fig. 1 is a top view of a supersonic light modulator arranged in accordance with the invention, Fig. 2 is a view on the line 2—2 of Fig. 1, Fig. 3 is a view of a portion of Fig. 1 as modified for a different use, Fig. 4 is a view similar to Fig. 2 but showing a modification, and Fig. 5 is a view indicating how the modulator may be used in the art of television.

The form of the invention shown in Figs. 1 and 2 includes a body essentially transparent for the light to be transmitted and capable of propagating mechanical waves, such as a cell 10 containing a body of suitable liquid 11 such as water or a light transparent hydrocarbon, etc. One side or wall 12 of the cell 10 is transparent and is associated with a lens 13 facing a diaphragm 14 having two similar parallel openings or slits 15 and 16. A single lens system 17 as indicated in Figs. 1 and 4, or a pair of suitably arranged lenses 17, as indicated in Fig. 2, directs light toward the diaphragm 14 from a source of light 18 so that the portions of this light which pass through the openings 15 and 16 in the diaphragm enter the lens 13 which transmits the light in essentially parallel rays into the body or cell 10. The diaphragm slits 15 and 16 may be actual openings or they may be transparent areas, the remainder of the diaphragm which may be of glass, for example, and on its side exposed to the light source being covered by an opaque coating. An electrically excitable mechanical vibrator, such as a piezo-electric quartz crystal 19, is arranged adjacent to the body of liquid 11 in the cell 10 and is provided with electrodes 20 and 21 on opposite surfaces, these electrodes being connected to an electric circuit 22 to which may be applied electric oscillations of supersonic high frequency, such as 10 to 500 mc. per sec., and of varying amplitude. This high frequency voltage produces corresponding mechanical variations or vibrations of the thickness, i. e. contractions and dilatations of the piezo-electric element 19, and these mechanical vibrations are transmitted to the body of liquid 11 through which they are propagated as compressional waves in parallel planes. The lens or optical system 13 passes the rays of light from the slits 15 and 16 into directions inclined and particularly perpendicular to the direction of propagation of the modulated supersonic mechanical waves and advantageously substantially parallel to the wave fronts of these waves in the body of liquid 11. The wall 23 of the cell 10 opposite the lens 13 has or is associated with a mirror or light reflecting inner surface of such shape that the parallel light rays reaching it through the liquid are reflected back through the liquid and concentrated by the lens 13 onto the diaphragm 14. The openings 15 and 16 in the form of narrow parallel slits are separated by a strip 24 of the diaphragm, the widths of this strip 24 and of each of the openings or slits 15 and 16, measured in the vertical direction as seen in Figs. 2 and 4, being preferably substantially equal. The optical system or lens 13 has a focal length substantially equal to its distance from the diaphragm 14. When the body of liquid 11 is not excited to mechanical vibration, the light incident upon the diaphragm 14 after first passing through the slits 15 and 16 and being reflected back through the lens 13 by the mirror 23 is, in one arrangement of the lens 13 and the mirror 23, so focused upon the diaphragm 14 that the light passing through each of the slits 15 and 16 on its way toward the cell 10 is focused upon the other slit and passes through it. The strip 24 of the diaphragm 14 has a mirrored surface facing the lens 13 and the diaphragm is turned at an oblique angle, preferably at an angle of 45°, with the direction of the light emerging from the lens 13 as indicated in Fig. 1, so as to reflect any light incident upon the strip 24 to one side instead of directly back toward the lens 13. If now the liquid body 11 be excited to vibrations, part of the light from the parallel beams passing the liquid toward mirror 23 is diffracted a first time by the periodic compressions and rarefactions of the liquid and, upon reflection by mirror 23, passes the liquid a second time, is diffracted again and directed by lens system 13 upon the mirror surface 24 of diaphragm 14. With increasing supersonic excitation, the double diffraction of light by the supersonic waves in the liquid will effectively cause an increasing portion of the light to be directed upon the mirror surface of the diaphragm and to be reflected thereby into the beam 26, thus producing positive proportional modulation. Thus, variations of the amplitudes of the vibrations of the piezo-electric crystal 19 corresponding to modulation of the high frequency voltage in the circuit 22 produce corresponding variations and substantially proportional modulations in the intensity of the light beam. Any light thus reflected from the mirrored surface of the strip 24 passes through a lens system 25 which may direct it into a beam 26 of parallel rays as shown in Fig. 1 or the lens 25 may bring the beam 26 to a focus as shown in Fig. 3 depending upon the purpose for which the modulator is to be used.

In another arrangement of the accordingly shaped mirror 23 and lens system 13, the light reflected from the mirror 23 through the lens system 13 when the liquid 11 is not excited to vibration, is focused upon the mirror surface of the diaphragm strip 24 and reflected into the beam 26. With this arrangement, the light will be twice diffracted by supersonic excitation of the liquid when passing it toward and from mirror 23, and directed toward the slits 15 and 16, so that the intensity of the beam 26 is effectively reduced, thus resulting in negative proportional modulation, or decreasing light intensity of the beam 26 with increasing supersonic wave amplitude.

Other arrangements of the diaphragm with its open or transparent slits and its opaque and mirror surface areas and of the lens system and mirror associated with the liquid cell will be readily apparent.

Thus, variations of the amplitudes of the vibrations of the piezo-electric crystal 19 corresponding to modulations of the high frequency voltage in the circuit 22 produce corresponding and substantially proportional variations or modulations in the intensity of the light beam 26. It should be understood that the parallel rays of the light beam 26 may comprise a radiation or rays within the visible and/or invisible spectrum of light (in the broadest sense of this term); in the invisible spectrum are, for instance, infrared light rays. The signals modulated upon the light beam 26 in any of the manners hereinbefore described, may comprise sound signals modulated upon the oscillations impressed upon the crystal 19, and in such case beam 26 may be utilized to transmit telephone signals. If the oscillations impressed upon the crystal 19 are modulated with television signals, the light beam 26 may be utilized to transmit television signals. Although any suitable receiver can be used, such as one utilizing a photo-electric cell or photo-electric screen excitable by visible or invisible (infrared) light rays, it is preferred to use particularly for the reception of television signals a supersonic television receiver similar to that described in the U. S. patents previously referred to herein. A corresponding arrangement is schematically shown in Fig. 5. The light beam 26 modulated with television signals contained in the supersonic, high frequency oscillations impressed upon crystal 19 (Figs. 1, 2) is transmitted and focused by lens system 25 upon a fast television scanner 31 at the remote receiver station, which reflects the modulation beam through a focusing lens system 32 upon a slow television scanner 33 which directs the modulated light beam or pencil onto a screen 34 to produce thereon a television picture in any manner particularly described in the patents referred to hereinbefore. If the light beam 26 comprises mainly visible light, screen 34 will be an ordinary viewing screen. If the light beam 26 comprises mainly invisible, such as infrared rays, screen 34 will comprise or be coated with a substance which can be excited to self-luminescence or transparency variations by the impinging rays. Of course, the manners of reproducing sound, television, etc., signals are not exhausted by the exemplifications stated and the one illustrated, and any other suitable receiving and reproducing system can be used to similar effect.

The positive or negative intensity modulation of the light beam 26 can also be recorded, for instance on the light sensitive surface of a movable photographic film 27 as indicated in Fig. 3. Thereby a sequence of spots of varying density can be recorded on that surface for sound or other recording purposes.

A light filter 28 may be interposed in the path of the light as indicated in Fig. 1. For example, an infrared light filter may be used to conceal the light beam 26 from detection. In order to facilitate directing the invisible beam upon a remote receiver, an eye piece 29 located behind the diaphragm 14 and in line with the light beam 26, Fig. 1, may be used with the lens system 25 to form a telescope for sighting and thereby directing the beam 26 toward the distant receiving station. A small cross or other suitable mark may be provided at the center of the back surface of the diaphragm 14 as indicated by dotted lines 30, to assist in sighting along the beam of light 26.

A thin field lens (not shown) may be arranged close to and in the back of diaphragm 14, Fig. 2, to concentrate light from the lenses 17 upon the lens system 13.

It will be appreciated from the foregoing description that the invention provides an extremely compact arrangement with a short light path. The arrangement is also highly efficient because the light passes through the supersonic cell or liquid 11 twice and is thus subjected twice to the modulating effects of the supersonic waves in the body or liquid. It follows that with the same power supplied to the crystal 19, the degree of modulation of light is higher than in previous arrangements in which the light passed through the liquid only once. Also, fewer lenses are required and this and the short optical path and small number of parts reduce the amount of scattered light and thus increase ease and accuracy of operation.

It should be understood that the invention is not limited to any exemplification hereinbefore described or shown but is to be derived in its broadest aspects from the appended claims.

What I claim is:

1. Supersonic light modulating apparatus including a body of liquid, means for producing supersonic mechanical waves in said liquid, a diaphragm having a transparent slit and a mirror surface, means for directing light through said slit and liquid, and means for reflecting the light back through the liquid to said mirror surface of the diaphragm, said mirror surface being at an oblique angle to the direction of said reflected light.

2. Supersonic light modulating apparatus including a body of liquid, means for producing supersonic mechanical waves in said liquid, a diaphragm having a transparent slit and a mirror surface, means for directing light through said slit, optical refraction means for directing light emerging from the slit into the liquid substantially parallel to the fronts of the waves in the liquid and substantially perpendicular to their propagation direction, means for reflecting the light back through said liquid and optical means to said mirror surface of the diaphragm, and focussing means in the path of the light reflected from said mirror surface of said diaphragm to focus light at a receiving station.

3. Supersonic light modulating apparatus including a body of liquid, means for producing supersonic mechanical waves in said liquid, a diaphragm with a surface having two parallel transparent slits and a mirror surface between said slits, means for directing light through said slits, optical refraction means for directing light from the slits into the liquid substantially parallel to the fronts of the mechanical waves in the liquid and substantially perpendicular to their propagation direction, means for reflecting the light back through said liquid to said mirror surface of the diaphragm, and focussing means in the path of the light reflected from said mirror surface of said diaphragm to focus light at a receiving station.

4. Supersonic light modulating apparatus including a body of liquid, means for producing supersonic mechanical waves in said liquid, a diaphragm having a transparent slit and a mirror surface, means for directing light through said slit, a lens system for refracting light from the slit into the liquid in directions substantially parallel to the planes of the waves in the liquid and perpendicular to their propagation direction, means for reflecting the light back through said liquid and lens system to said mirror surface of the diaphragm, said mirror surface being at an oblique angle to the direction of said light to reflect it to one side of said lens system, and a second lens system in the path of the light reflected from said mirror surface of said diaphragm to focus light at a receiving station.

5. Supersonic light modulating and directing apparatus including a body of liquid, means for producing supersonic mechanical waves in said liquid, a diaphragm having a transparent slit and a mirror surface, means for directing light through said slit and liquid, means for reflecting the light back through the liquid to said mirror surface of the diaphragm, the diaphragm and its mirror surface being at an oblique angle to the direction of said reflected light, a lens system in the path of the light reflected from the mirror surface of said diaphragm, and an eyepiece in line with said lens system and said diaphragm slit cooperating with said lens system to form a sighting telescope, said lens system and eyepiece being located on opposite sides of said diaphragm.

6. Supersonic light modulating and directing apparatus including a body transparent for light and capable of propagating mechanical waves, electrically excitable means for producing supersonic mechanical waves in said body, a diaphragm having two parallel transparent slits separated by an opaque strip, the widths of said slits and strip being substantially equal, means for directing light onto said diaphragm and through said slits onto said body, optical refraction means in the path of the light emerging from said slits for directing it into said body substantially perpendicular to the direction of propagation of mechanical waves through said body, means associated with said body for reflecting the light back through said body and said refraction means to said diaphragm, further light reflecting means associated with said strip and facing said body for reflecting the reflected back light in a predetermined direction, said further reflecting means being inclined with respect to the path of said reflected back light.

7. Supersonic light modulating and directing apparatus as set forth in claim 6, including focussing means in line with the path of the light reflected by said further reflecting means to focus light at a receiving station.

8. Supersonic light modulating and directing apparatus including a body transparent for light and capable of propagating mechanical waves, electrically excitable means for producing mechanical waves of supersonic high frequency in said body, a diaphragm having two parallel transparent slits separated by an opaque strip, the widths of said slits and strip being substantially equal, a source of light, optical means between said source and diaphragm for directing light from said source onto said diaphragm and through said slits onto said body, optical refraction means between said diaphragm and body for directing light passing said slits substantially parallel to the fronts of the mechanical waves when produced in said body and substantially perpendicular to their propagation direction, means for reflecting the light back through said body and said optical refraction means to said diaphragm, further reflecting means associated with said strip to reflect the reflected back light, said further reflecting means being inclined with respect to the path of the reflected back light so as to reflect it in predetermined direction away from said body toward a receiving station.

9. Supersonic light modulating and directing apparatus as set forth in claim 8, in which said optical means for directing the light from said source to said diaphragm essentially consists of two lenses, one lens in the path of the light from said source to each of said slits.

10. Supersonic light modulating and directing apparatus as set forth in claim 8, including focussing means in the path of the light reflected by said further reflecting means.

11. Supersonic light modulating and directing apparatus as set forth in claim 8, including means for moving a surface sensitive to the light reflected by said further reflecting means, and optical means for focusing such light upon said light sensitive surface.

12. Supersonic light modulating and directing apparatus as set forth in claim 8, including optical means for directing the light reflected by said further reflecting means in essentially parallel light rays to a remote receiver.

13. Supersonic light modulating and directing apparatus as set forth in claim 8, in which said optical refraction means between said diaphragm and body focuses substantially all the reflected back light through said slits when said body is free from mechanical waves.

14. Supersonic light modulating and directing apparatus as set forth in claim 8, in which said optical refraction means between said diaphragm and body focuses substantially all the reflected back light upon said reflecting means associated with said strip when said body is free from mechanical waves.

ADOLPH H. ROSENTHAL.

REFERENCES CITED

The following references are of record in the file of this patent:

UNITED STATES PATENTS

| Number | Name | Date |
| --- | --- | --- |
| 1,740,673 | Whitker | Dec. 24, 1929 |
| 1,906,803 | Mueller | May 2, 1933 |
| 2,308,360 | Fair | Jan. 12, 1943 |
| 2,341,422 | Bubb | Feb. 8, 1944 |